United States Patent [19]

Lawrence

[11] Patent Number: 4,897,192
[45] Date of Patent: * Jan. 30, 1990

[54] ROTARY FILTRATION DEVICE

[76] Inventor: William J. Lawrence, 5 Harbor La., Kemah, Tex. 77565

[*] Notice: The portion of the term of this patent subsequent to Apr. 4, 2006 has been disclaimed.

[21] Appl. No.: 291,050

[22] Filed: Dec. 28, 1988

Related U.S. Application Data

[63] Continuation-in-part of Ser. No. 220,154, Jul. 18, 1988, Pat. No. 4,818,401.

[51] Int. Cl.$^4$ .............................................. B01D 33/22
[52] U.S. Cl. .................................. 210/330; 210/380.1
[58] Field of Search ............ 210/780, 330, 331, 360.1, 210/380.1

[56] References Cited

U.S. PATENT DOCUMENTS

| | | | |
|---|---|---|---|
| 1,269,067 | 6/1918 | Enell | 210/331 |
| 2,038,921 | 4/1936 | Blaufuss | 210/330 |
| 3,395,801 | 8/1968 | Muller | 210/331 |
| 3,997,447 | 12/1976 | Breton et al. | 210/780 |
| 4,243,536 | 1/1981 | Prolss | 210/331 |
| 4,698,156 | 10/1987 | Bumpers | 210/360.1 |

Primary Examiner—Ivars Cintins
Attorney, Agent, or Firm—Tim L. Burgess

[57] ABSTRACT

A filtration device includes in a pressure vessel a driven rotary shaft having a longitudinal bore. Fluid suspension to be processed to recover the fluid is expelled from distributing conduit, situated either in the shaft or in the vessel, the outlets of which open to the cavity of the pressure vessel at central processing zones proximate the shaft adjacent the radially inward portions of annular filtration discs secured to the shaft. The filtration discs are laminates in which an inner conducting support layer is enclosed by an outer filtration layer. The layers are porous, the pores are in fluidic communication, and the pores of the inner layer are larger than the pores in the outer layer. Fluid collecting in the outer layer of a spinning filter disc flows from the inner layer through collecting passageways to the longitudinal bore in the shaft, and is removed from the vessel through a conduit fluidly communicating with longitudinal bore.

17 Claims, 4 Drawing Sheets

ROTARY FILTRATION DEVICE

CROSS REFERENCE TO RELATED APPLICATION

This application is a continuation-in-part application of copending application, Ser. No. 07/220,154, filed July 18, 1988, by William J. Lawrence, entitled Rotary Filtration Device, now U.S. Pat. No. 4,818,401.

FIELD OF THE INVENTION

This invention relates to rotary filtration devices for continuous filtration of solid materials from fluid medium in which solids are suspended, and more particularly, relates to continuous filtration devices in which the filtration medium is a porous element, such as ceramic or sintered metal discs or plates, rotated within the fluid suspension.

BACKGROUND OF THE INVENTION

U.S. Pat. No. 3,395,801 depicts a basic rotary filtration structure. U.S. Pat. Nos. 3,997,447 (to Breton et al) and 4,698,156 (to Bumpers), in particular, are illustrative of rotary filtration structures which Applicant's invention improves, involving high speed rotating micropore disc filteration devices. In U.S. Pat. Nos. 3,395,801, 3,997,447 and 4,698,156, a plurality of filter discs are mounted on a rotatable hollow shaft having a plurality of radial openings. The shaft is mounted for high speed rotation in a vessel or chamber which, unlike in a bowl centrifuge, remains stationary. The fluid suspension to be filtered is admitted directly into the vessel. The filtration surfaces rotate through the fluid suspension, and filtrate flows through the surfaces into the core of the filter. The filtrate flows from the filter core through the radial openings in the shaft into the hollow of the rotating shaft, and then is conducted out the hollow for collection outside the vessel.

More particularly, as disclosed in U.S. Pat. Nos. 3,997,447 and 4,698,156 it is known to rotate through a fluid suspension a porous filtration element composed of a laminated structure comprised of combinations of porous layers in which the pores of each layer are in open communication. The filtration elements are usually constructed from sinterable metal or ceramic powders which have been sized and formed into laminated plates of interconnecting and communicating pores by powder metallurgy techniques or with fine screens having micron range pore sizes made using expanded metal technology or by selective dissolution techniques. Several preparation methods are disclosed in U.S. Pat. No. 3,997,447, which is incorporated herein by reference for all purposes. In the filtration elements, an interior layer of large pore sizes acts as a support and collecting layer for an outer confining layer of smaller pore sizes. The pore sizes may be submicron and larger. Thus, for example, an application of such filtration devices may be to remove minute particles from lake or other intake water used in steam injection plants or in nuclear power plants to reduce corrosion buildup in steam lines and reduce problems of disposal of particles in primary cooling loop steam which would be made radioactive. As disclosed in U.S. Pat. No. 3,997,447, the sintered metal powder filtration element conventionally is fabricated into structure such as annular plates, attached to a hollow shaft. Fluid separated from suspended matter in a fluid suspension through which the element is rotated flows from the outer to the inner layer of the element and courses through admitting slots provided in the hollow shaft to a conduit leading to the exterior of the shaft for collection at a remote point.

A difficulty with the rotating filter disc technology disclosed by U.S. Pat. Nos. 3,997,447 and 4,698,156, is that to be processed by the spinning filter discs, the fluid suspension must be in a processing zone which is between the shaft and the tips of the spinning microdiscs, and to gain access to the processing zone, the fluid suspension must flow radially inwardly past the tips against the flow direction of solids and fluids centrifugally cast radially outwardly from the shaft.

This circulation problem in high speed rotating disc filters is not present in such rotational filtration apparatus as represented by U.S. Pat. No. 2,038,921. The apparatus in U.S. Pat. No. 2,038,921 removes filtrate through a hollow rotary shaft like U.S. Pat. Nos. 3,997,447 and 4,698,156, but, unlike the discs of U.S. Pat. Nos. 3,997,447 and 4,698,156 which cut through fluid suspension in the vessel at high speeds, U.S. Pat. No. 2,038,921 rotates the filter units only exceedingly slowly; revolutions are measured in terms of hours (col. 4, line 75 to col. 5, line 2). The filter units are rotated slowly specifically to prevent agitation within the vessel when the filter is in operation (col. 2 line 59 to col. 3 line 1) while shaving off impurity laden surface layers of a filter cake builtup in situ for the filtration medium. Like U.S. Pat. Nos. 3,395,801 3,997,447 and 4,698,156, in U.S. Pat No. 2,038,921 the fluid suspension to be filtered is introduced directly into the vessel, but unlike them, the fluid suspension is introduced through the same perforated piping employed for the in situ laydown of the filter cake. The perforations are spread along the pipe aimed at the plate on which the filter cake is deposited, but the perforations do not reach near the shaft, avoiding filter cake buildup proximate the shaft.

Nor is the impedance in fluid suspension circulation that is the problem of high speed rotating discs encountered in bowl centrifuge filtration apparatus. In bowl centrifuges such as those of the type disclosed in U.S. Pat. Nos. 1,269,097 and 1,038,607, the filtration members are not spun through the fluid suspension; instead the fluid suspension and the filtration membranes both spin in the same direction inside the spun bowl. In U.S. Pat. Nos. 1,269,097 and 1,038,607, the suspension to be filtered is introduced through a radially widening axial conduit at the center of the bowl for discharge into at the base of the bowl into an open chamber to separate the heavier matter. Pathways are provided up from the open base chamber for flow of the clarified fluids through filtration membranes to a collecting annulus.

Most remote to the problem is filtration apparatus such as U.S. Pat. No. 4,243,536, in which no part of the filtration apparatus is rotary. In U.S. Pat. No. 4,243,536, the whole apparatus is stationary, and operates based on a cycloidal flow of liquid emitted tangentially from an inlet pipe near the center of the cylinder.

BRIEF DESCRIPTION OF THE INVENTION

It is an object of my invention to provide a more efficient filtration device which overcomes the above described fluid suspension flow circulation problems inherent in prior structure used in high speed rotating microdiscs.

A filtration device is provided for filtering fluid medium from matter in a fluid suspension in a vessel. The device comprises a rotary shaft having a longitudinal axis and a longitudinal outflow bore. The shaft is journaled to rotate about the shaft axis in the vessel, preferably vertically. A plurality of annular porous filtration members each having inner and outer perimeters are secured coaxially to the shaft. The filtration members are of the type constructed as described in U.S. Pat. No.3,997,447 to Breton et. al. Each member comprises a porous inner support layer and a porous outer filtration layer confiningly overlaying the inner support layer. The pores in the outer layer are smaller than the pores in the inner layer. The pores of the outer and inner layers are in fluidic communication, so that upon immersion in a fluid suspension, the fluid medium can pass from the outer layer to the inner layer. Filtrate from the inner layer of said filtration member is delivered into the outflow bore by filtrate delivery passages provided in fluidic communication with the inner layer of each filtration member and the outflow bore.

In accordance with my invention, a plurality of fluid suspension distribution outlets are provided for discharging fluid suspension to central zones within the vessel adjacent the radially inward portions of each filtration member outer layer. These outlets are spaced apart longitudinally with respect to the shaft. Each outlet opens into the vessel adjacent an outer layer of filtration members at a portion of the member proximate the shaft radially inwardly remote from the outer perimeter of the filtration member.

In a first embodiment of the invention, structure provides fluid suspension distribution outlets which rotate with the shaft and deliver fluid suspension into the vessel from conduits coursing through the shaft. Dispersal conduits, fluidically intercommunicate the outlets with an inflow conduit provided in the rotary shaft substantially parallel to the outflow bore in the shaft. In this first embodiment, the inflow conduit, in a first aspect (not illustrated), may be a tubular member which is fluidically connected at one end to a source of fluid suspension remote from the rotary shaft, closed at the other end, and surrounded coaxially by the outflow bore. In a second and preferred aspect of the first embodiment, the inflow conduit is a bore in the shaft laterally displaced from the outflow bore. In this latter aspect, the dispersal conduits are preferably spaced apart longitudinally with respect to the shaft. Further in this latter aspect, the above-mentioned outlets are included in the outer periphery of a plurality of annular members coaxially secured to the shaft A circumferential channel in the inner perimeter of the annular member fluidically communicates with the inlet conduit in the shaft, and fluidways communicate the channel to the outlets.

In the first embodiment sealing members juxtaposed above and below each filtration member fixedly sealingly engage the shaft and engage the filtration member to seal off fluid communication between the fluid suspension distribution structure and the filtrate distribution structure.

In a second embodiment of the invention, structure provides fluid suspension distribution outlets which do not rotate with the shaft and which open from conduits coursed inwardly from, e.g., a remote source of fluid suspension outside the vessel, towards the shaft past the outer perimeters of the filtration members. In this embodiment, the outlets may open in a direction from normal to substantially parallel to the shaft for delivery of the fluid suspension adjacent an outer layer of the filtration member at a portion of the member proximate the shaft remotely radially inward from the outer periphery of the filtration member.

Applied pressure differential passes a fluid suspension to be filtered into the fluid suspension distribution structure and passes filtrate from said filtration member outer layers through the filtrate delivery structure out said outflow bore.

In use, upon application of a pressure differential to cause a flow of fluid suspension through the fluid suspension distribution structure, the fluid suspension flows through the fluid suspension distribution structure out to the outlets into a central processing zone adjacent outer layers of a filtration member proximate the rotary shaft. There fluid in suspension circulates in time radially outward and fluid is filtered from the suspension and goes through the filtration member from the outer layer to the inner layer. Filtrate then flows from the inner layer through the filtration delivery structure through the outflow bore to an outlet conduit for collection. In accordance with my invention, fluid suspension is thus introduced into a central processing zone and progresses radially outwardly from the rotating shaft rather than having to gain access to the zone radially inwardly, and filtration thereby is enabled to proceed more efficiently and effectively.

DESCRIPTION OF THE PREFERRED EMBODIMENT

Figures 1, 3, 4:
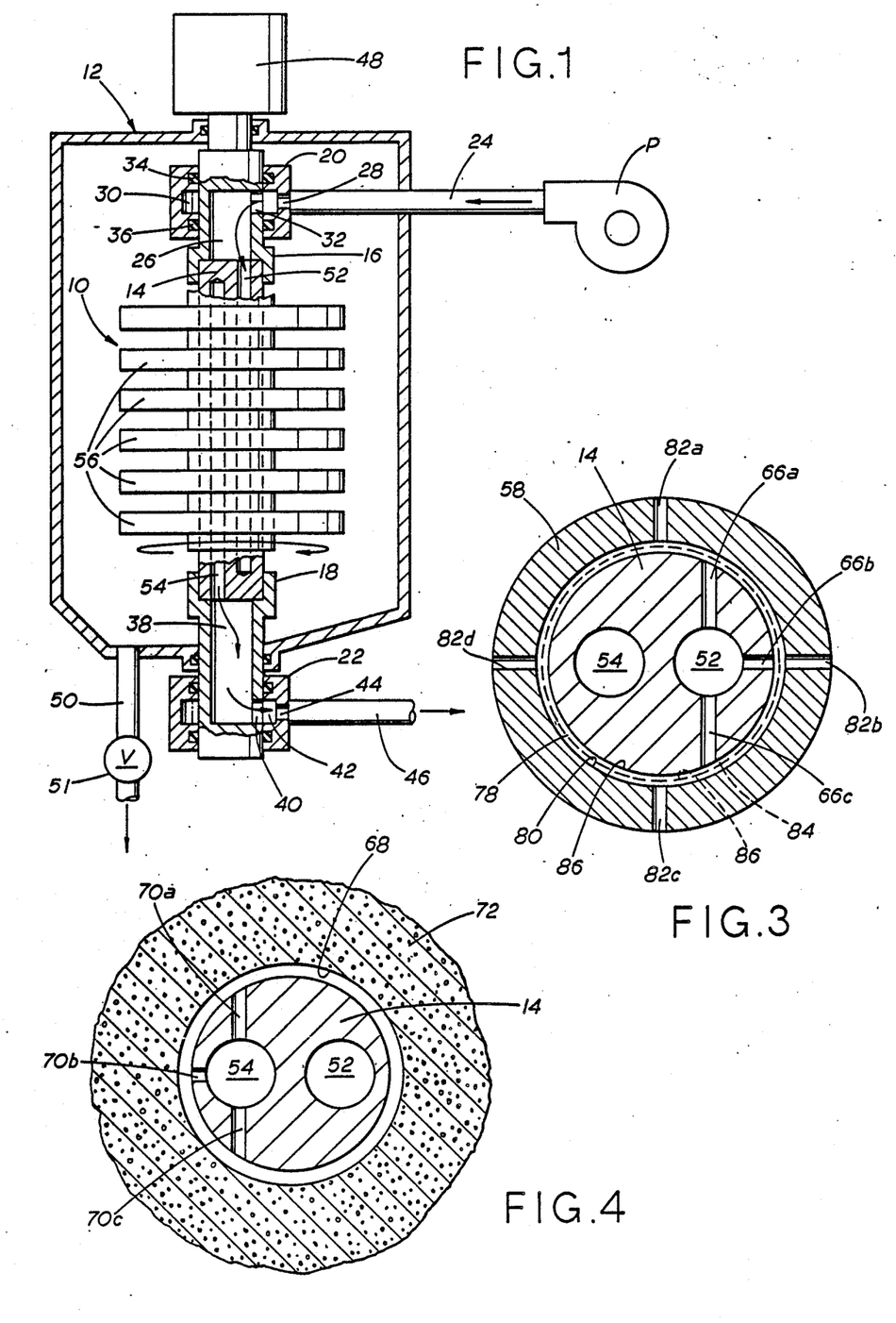
FIG. 1 is an elevational partial sectional view of one embodiment of a high speed rotary filter incorporating my invention.
FIG. 3 is a horizontal cross-sectional view of a filter distribution element taken along the lines 3—3 of FIG. 2.
FIG. 4 is a horizontal cross-sectional of a filter processing element taken along the lines 4—4 of FIG. 2.

In the drawings there are shown preferred embodiments of an improved filtration device in accordance with my invention. Referring to FIG. 1, in a first embodiment a rotating assembly indicated generally by reference numeral 10 is mounted within a pressure vessel 12, and includes a vertically disposed rotary shaft 14 connected at top to a rotary coupling inflow conduit 16 and at bottom to rotary coupling outflow conduit 18. Rotary coupling conduits 16, 18 respectively are aligned and journaled within bearing support manifolds 20, 22. Inlet conduit 24 is in fluid communication with the hollow interior 26 of coupling inflow conduit 16 by means of port 28, annulus 30 and slots 32. Fluid suspension admitted through inlet conduit 24 is confined within annulus 30 by seals 34, 36. Similarly, at the base of the pressure vessel, the interior 38 of rotary coupling outflow conduit 18 is in fluid communication through slots 40, annulus 42, and port 44 to outlet conduit 46. A drive motor 48 imparts rotational motion to rotary shaft 14 through coupling conduit 16. A drain 50 choke valved at 51 provides means for maintenance of desired pressure in vessel 12 and flush of separated materials and residual fluids suspension from vessel 12.

Figure 2:
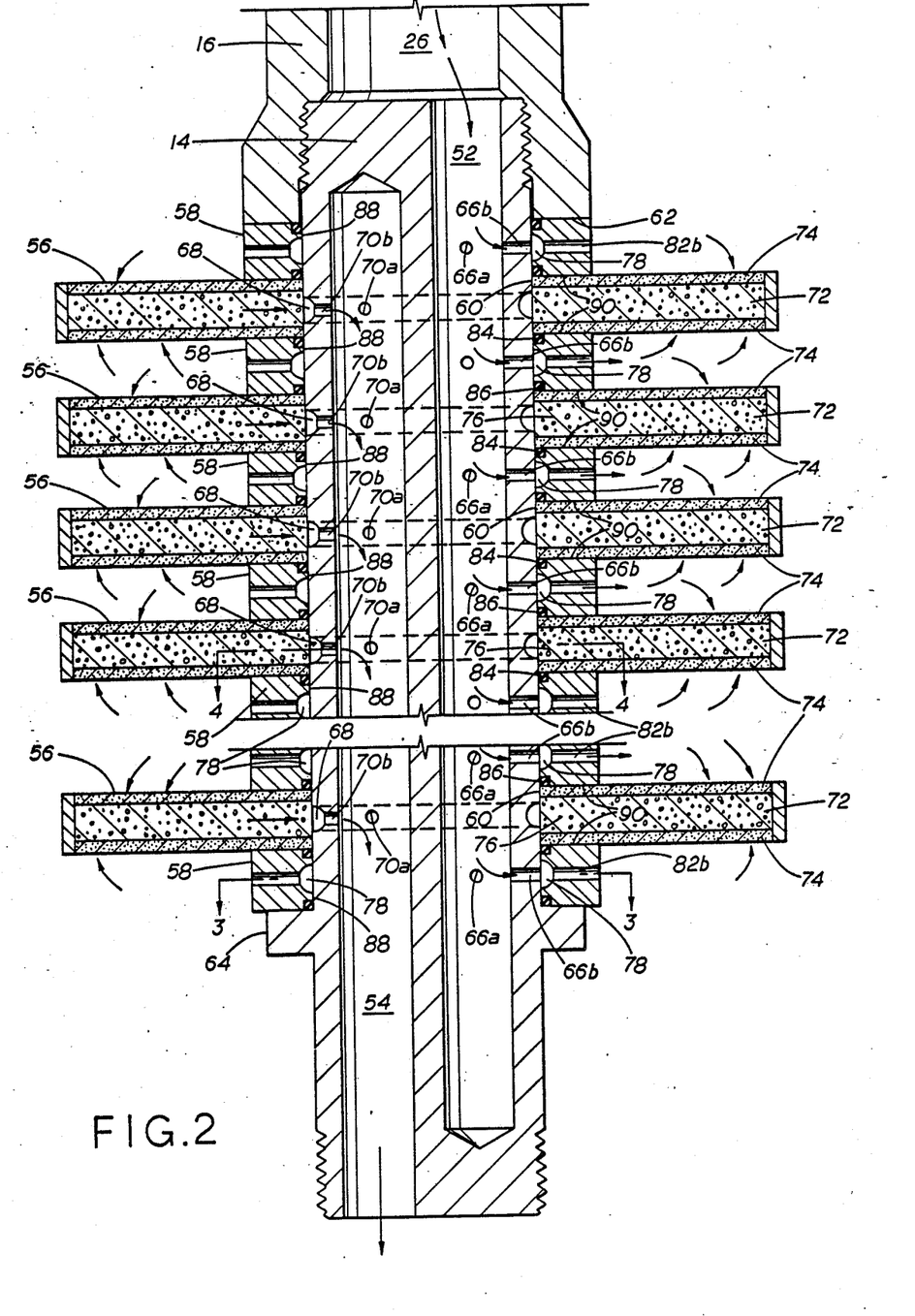
FIG. 2 is a vertical cross-sectional view of a portion of the filter of FIG. 1.

Referring both to FIGS. 1 and 2, rotary shaft 14 includes an inflow bore 52 in fluid communication with the interior hollow of coupling conduit 16, and an outflow bore 54 in fluid communication with the interior hollow of coupling conduit 18. Attached to shaft 14 are a plurality of annular porous filtration elements 56, and adjacent each element, a fluid suspension distribution member 58. Inflow bore 52 and outflow bore 54 are substantially parallel one to the other and each are substantially parallel to the longitudinal axis of rotary shaft 14.

Referring to FIG. 2, annular porous filtration members 56 and annular fluid distribution members 58 in alternating sequence are coaxially engagingly fitted at their inner diameter to the outer diameter of cylindrical rotary shaft 14, with fluid distribution members 58 above and below each fluid filtration element 56. The filtering elements 56 and fluid distribution members 58 are clamped into place by shoulder 62 of coupling 16 pressing against retainer ring 64 of shaft 14. The engagement fit of fluid suspension distribution members 58 and filtration elements 56 and the clamping action of coupling 16 on shaft 14 by ring 64 are correlated to assure that distribution members 58, filtration elements 56 and shaft 14 rotate as one body.

Referring to FIG. 3 in conjunction with FIG. 2, a plurality of portways 66a, 66b, and 66c, all substantially normal to the axis of inflow bore 52, connect the inflow bore 52 with the exterior of shaft 14.

Referring to FIG. 4 in conjunction with FIG. 2, a plurality of circumferential external grooves 68 are provided in the periphery of shaft 14. Grooves 68 are coaxially disposed to the longitudinal axis of shaft 14 and spaced apart at predetermined intervals along the length of the shaft. Referring to FIG. 2, portways 66 (66a and 66b are visible) are disposed along the length of shaft 14 with at least one portway above and at least one portway below each of adjacent ones of the plurality of circumferential grooves 68. Referring to FIG. 4 in connection with FIG. 2, groove passageways 70a, 70b and 70c interconnect each groove 68 with outflow bore 54, substantially normal to axis of outflow bore 54.

Referring to FIG. 4 in conjunction with FIG. 2, annular porous filtration members 56 comprise a porous inner support layer 72 and porous outer filtration layer 74 enveloping inner support layer 72. The pores in the outer layer 74 are smaller than the pores in the inner layer 72. The pores in layer 72 and 74 are in fluidic communication, such that upon immersion of filtration member 56 into a fluid suspension, the fluid medium can pass from outer layer 72 into inner layer 74. Support layer 72 is aligned at the inner diameter 76 thereof with external groove 68.

Referring to FIG. 3 in connection with FIG. 2, the fluid suspension distribution members 58 have a circumferential distributing annulus or channel 78 in the inner diameter or inner perimeter 80 of member 58. Fluid ways or dispersal conduits 82a, 82b, 82c and 82d substantially normal to the axis of member 58 fluidly communicate channel 78 radially outwardly to the outer perimeter exterior of member 58. Sealing means, suitably O-ring seals 84 of diameter to friction fit to shaft 14 are seated within annulus ring grooves 86 provided at the margin between the inner diameter 88 of member 58 and the lateral face 90 of member 58 juxtaposed to the opposing outside face of layer 74 of member 56. Members 58 provide O-rings 84 juxtaposed above and below each rotation member coaxially fixedly sealingly engaging shaft 14 and engaging the adjacent filtration member 56 to seal off fluid communication between member 58 and filtration 56.

In operation, a fluid suspension to be processed is pumped under pressure into pressure vessel 12 by inlet 24 through fluid passageways 24, 28, 30, 32, 26 into inflow bore 52. In bore 52, the fluid suspension discharges from bore 52 through portways 66 into distributing annulus 78 and out distributing annulus 78 through fluidways 82 into the cavity of pressure vessel 12. When sufficient fluid suspension has been introduced to raise the level of the fluid suspension above the uppermost filtration member 56, drive motor 48 is activated and rotary assembly 10 is brought to a desired speed of rotation. Choke valve 51 is adjusted to maintain the desired back pressure in vessel 12. Fluid suspension continuing to be pumped through bore 52 from inlet 24 and exiting as above described through fluidways 82 is expelled into a processing zone adjacent opposing faces 74 of filtration members 56. Shearing forces imposed by the spinning filter discs acting on the suspension are processingly applied to the suspension at the pores of outer layer 74 and fluid filtrate passes layer 74 into layer 72. From there the filtrate is collected by collecting groove 68 and passes into outflow bore through collecting groove passageways 70. The filtrate flows from outflow bore 54 into hollow 38 and passages 40, 42 44 into outlet conduit 46.

Figure 5:
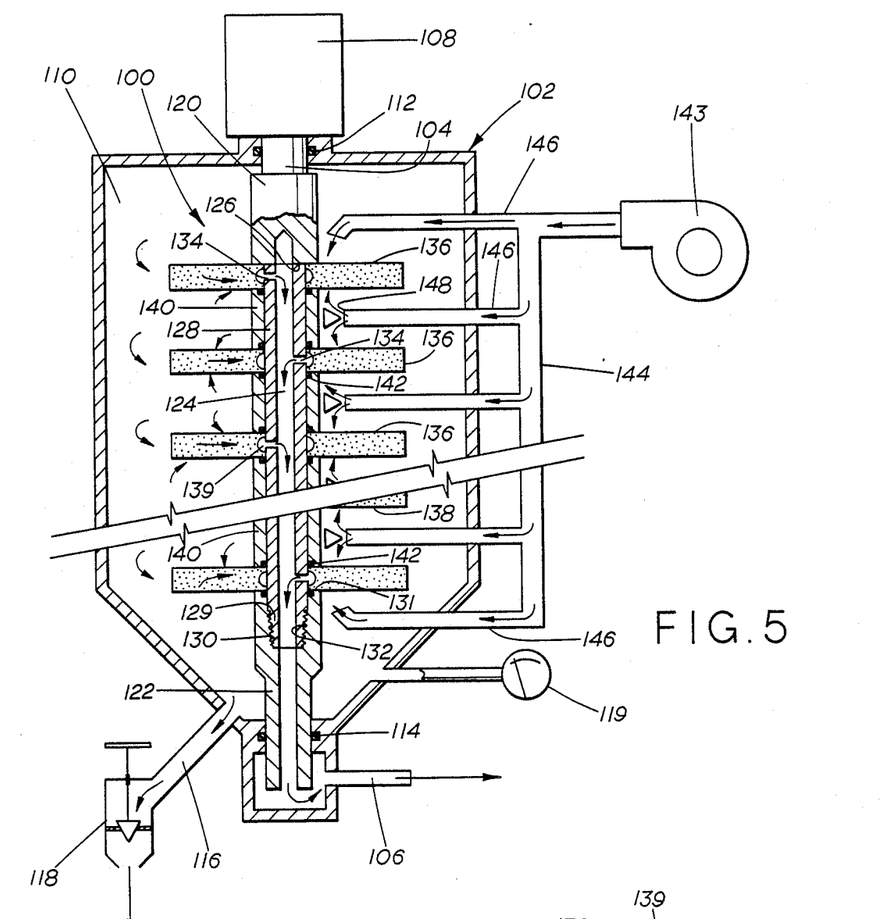
FIG. 5 is a schematic veritcal sectional view of another embodiment of a high speed rotary filter apparatus in accordance with my invention.
Figure 6:
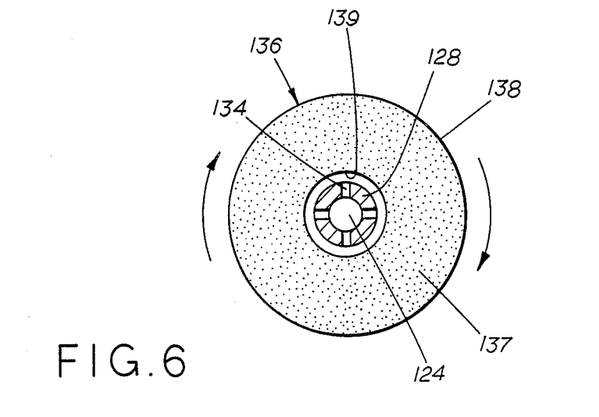
FIG. 6 is a cross-sectional view of a filter processing element taken along the lines 6—6 of FIG. 5.
Figure 7:
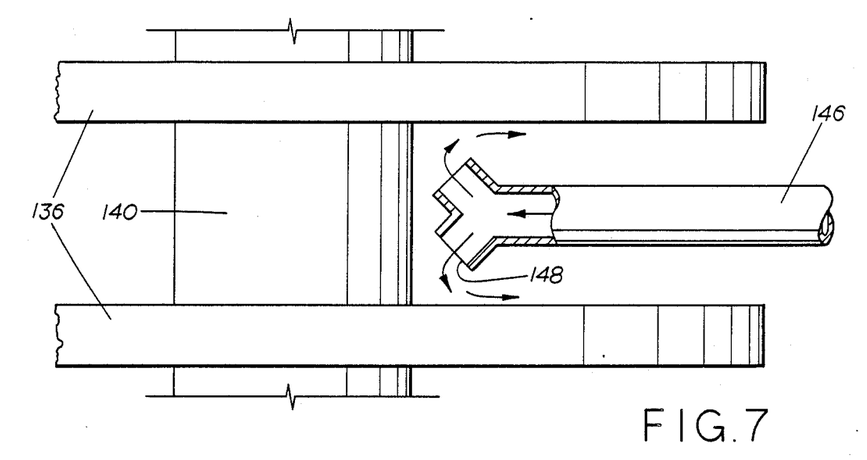
FIG. 7 is an elevational view, in partial vertical setion, of a portion of the apparatus of FIG. 5.
Figure 8:
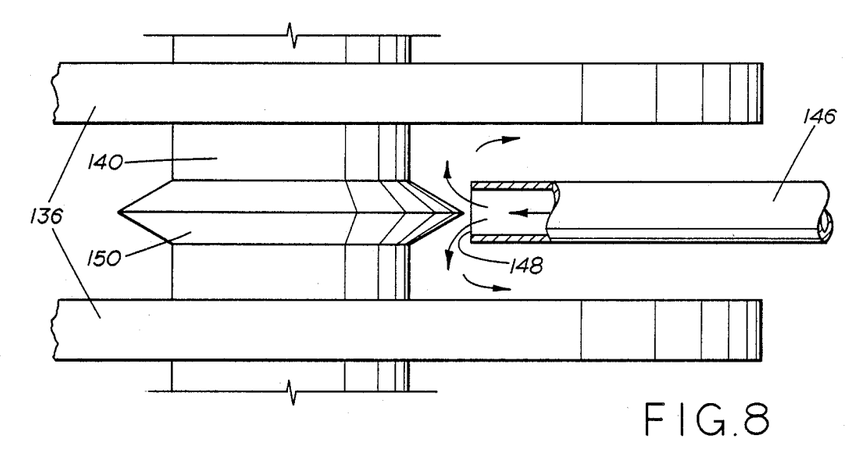
FIG. 8 is an elevational view, in partial vertical section, of an alternative embodiment to that depicted in FIG. 7.
Figure 9:
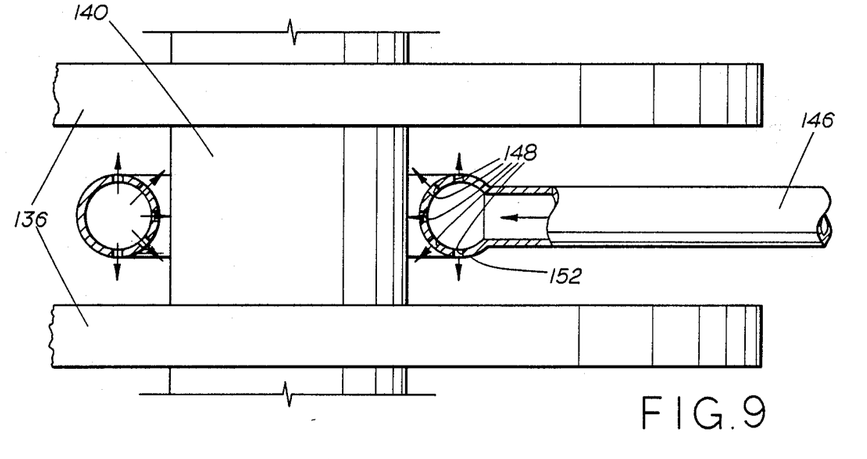
FIG. 9 is an elevational view, in partial vertical section, of another alternative embodiment to that depicted in FIG. 7.

A second embodiment of the invention is disclosed in FIGS. 5 and 6 with several variations depicted in FIGS. 7-9. Referring to FIG. 5 a rotating assembly 100 mounted vertically in a pressure vessel 102 includes a rotary shaft assembly 104 journaled for rotation about its longitudinal vertical axis in the vessel and connected at bottom to a rotary coupling outflow conduit 106. A drive motor 108 imparts rotary motion to the shaft. Fluid suspension is confined within the chamber 110 of vessel 102 by seals 112, 114 about the shaft. A drain 116 valved at 118 is provided for removal of solids separated from the fluid suspension. Vessel pressure is monitored by pressure guage 119.

Shaft assembly 104 is made up of upper and lower threaded shaft members 120 and 122, each of which contains a central hollow comprising a bore 124. Upper shaft member 120 necks at rimface 126 to a narrower cylindral portion 128, the foot of which tapers in a frusto-conical portion 129 having external threads 130. Lower shaft member 122 widens at the mouth of bore 124 to accomodate portion 129 and has an upper internally threaded portion 132 formed therein accomodating the external threads 130 of upper shaft member 120. A flange face 131 is defined at the periphery of the bore mouth and the external wall of the lower shaft member 122. A plurality of slots or passages 134 are interspersed along the length of upper shaft member portion 128, radiating outwardly from central bore 124. A plurality of annular filter discs 136 are carried by upper shaft member portion 128 at the inner periphery of the annular discs.

The filter discs are of the construction described above, with an inner layer 137 confiningly overlaid by an outer layer 138. The inner periphery of each of the discs 136 is formed with a suitable channel 139 for fluidic communication of the inner layer 137 with the slots 134. A series of spacing and sealing rings 140 with seals 142 are located between successive filtration discs. Seals 142, suitably 0-ring seals, cause bore 124 to communicate only with the inner layer of the filter discs. Spacer rings 140 space the filter discs apart and cooperate with lower shaft member 122 threaded onto upper shaft member 120 to press all the filter discs and sealing rings together between rim face 126 and flange face 131. As pressed onto the shaft, the shaft, the filter discs 136 and the spacing and sealing rings 140 rotate together.

The fluid suspension to be filtered, under pressure imposed by pump 143, flows into the vessel 102 from fluid suspension distribution manifold 144 through pipe arms 146 which open at 148 proximate the shaft adjacent an outer layer 138 of each filter disc 136 and radially inwardly remote from the outer periphery of the filter disc. As illustrated in FIGS. 5 and 8, the pipe opening 148 may be normal to the shaft, which may have a diverter ring 150 secured to the periphery of the spacing rings 140 rotating with the shaft to divert the effluent from pipe opening 148 to the outer layer of the filter disc proximate the shaft. Or, as illustrated in FIGS. 5 and 7, the pipe may be bifurcated at its mouth and the openings 148 may be directed in a range from acutely angled towards the shaft and spacing rings 140 to substantially parallel to the axis of the shaft. FIG. 9 illustrates an embodiment in which pipe arms 146 terminate in a distribution loop 152 having a plurality of openings 148 ranging in a direction from normal to substantially parallel to the axis of the shaft.

Various modifications and changes may be made to the preferred embodiments disclosed herein and will become apparent to those skilled in the art, yet will be within the scope and spirit of the invention, and such modifications and changes are comprehended within the claims which now follow:

I claim:
1. A filtration device for filtering fluid medium from matter in a fluid suspension in a vessel, which comprises:
   a. a rotary shaft having a longitudinal axis, a longitudinal outflow bore, and journaled to rotate about said axis in the vessel,
   b. means for imparting rotation to said rotary shaft,
   c. a plurality of annular porous filtration members having inner and outer perimeters, secured coaxially to said shaft, each member comprising a porous inner support layer and a porous outer filtration layer confiningly overlaying the inner support layer, the pores in the outer layer being smaller than the pores in the inner layer, the pores of said layers being in fluidic communication so that upon immersion in a fluid suspension the fluid medium can pass from the outer layer to the inner layer,
   d. fluid suspension distribution means in the vessel defining a plurality of fluid suspension outlets spaced apart longitudinally with respect to said shaft, each outlet opening into the vessel adjacent an outer layer of at least one filtration member at a portion thereof proximate said shaft radially inward from the outer perimeter of said member, for discharging fluid suspension to central zones within the vessel adjacent said radially inward portion of each filtration member outer layer,
   e. filtrate delivery means in fluidic communication with the inner layer of each filtration member and the outflow bore for delivering filtrate from the inner layer of said filtration member into said outflow bore, and
   f. means for passing a fluid suspension to be filtered into said distribution means and for passing filtrate from said filtration member outer layers through said filtrate delivery means out said outflow bore.

2. The device of claim 1 in which the fluid suspension distribution means includes (i) means defining an inflow conduit in said shaft substantially parallel to said outflow bore, and (ii) means defining dispersal conduits fluidically communicating said inflow conduit and each of said outlets.

3. The device of claim 2 in which said inflow conduit is a tubular member closed at one end and coaxially secured within said outflow bore.

4. The device of claim 2 in which said inflow conduit is a bore in said shaft laterally displaced from said outflow bore.

5. The device of claim 2 in which said dispersal conduits are spaced apart longitudinally with respect to said shaft.

6. The device of claim 5 in which the fluid suspension distribution means includes a plurality of annular members having inner and outer perimeters, each member being secured coaxially to said shaft, and wherein said means defining dispersal conduits includes (i) means defining a circumferential channel in the inner perimeter of the annular membrane, and (ii) means defining at least one fluidway normal to said channel fluidically communicating said channel with at least one of said outlets.

7. The device of claim 5 in which each annular member includes a plurality of the fluidway conduits and a plurality of outlets.

8. The device of claim 7 in which said fluidway conduits are radially concentric with said rotary shaft.

9. The device of claim 8 in which said means defining dispersal conduits includes at least one portway conduit radially concentric with said inflow bore and fluidically communicating said bore with said channel.

10. The filtration device of claim 1 in which the outlets of said fluid suspension distribution means open from conduits coursed inwardly past the outer perimeter of the filtration member toward the shaft.

11. The filtration device of claim 1 in which said outlets open in a direction facing said shaft substantially normal to the axis of the shaft and wherein said fluid suspension distribution means includes diverter means secured to the periphery of said shaft opposite each outlet, for diverting discharge from each outlet toward said radially inward portion of said filtration member outer layer adjacent the outlet.

12. A filtration device for filtering fluid medium from matter in a fluid suspension in a vessel, which comprises:
   a. a rotary shaft having a longitudinal axis and journaled to rotate in the vessel, and including means defining:
      (1) an inflow bore having an axis substantially parallel to the longitudinal axis of said shaft, and
      (2) an outflow bore spaced apart from and substantially parallel to said inflow bore, b. means for imparting rotary motion to said rotary shaft, c. a plurality of annular porous filtration members coaxially secured to said shaft, each member comprising a porous inner support layer and a porous outer filtration layer confiningly overlaying the inner support layer, the pores in the outer layer being smaller than the pores in the inner layer, the pores of said layers being in fluidic communication so that upon immersion in a fluid suspension the fluid medium can pass from the outer layer to the inner layer, d. fluid suspension distribution means, including (i) means defining a plurality of inlets in fluidic communication with said inflow bore spaced apart longitudinally with respect to said inflow bore and (ii) means defining a plurality of outlets interspersed with said filtration members and in fluidic communication with said inlets, said outlets opening into the vessel at intervals adjacent said outer layers of each filtration member at a portion thereof radially inwardly proximate the shaft, for distributing fluid suspension from said inflow bore to zones within said vessel proximate said shaft.

e. filtrate distribution means, at spaced intervals along said shaft adjacent each of the filtration members, in fluidic communication with the inner layer of each filtration member and said outflow bore, for distributing filtrate form the inner layer of said filtration member into said ouflow bore, f. sealing means coaxial to said shaft and juxtaposed above and below each said filtration member for sealing off fluid communication between said fluid suspension distribution means and said filtrate distribution means, and g. means for passing a fluid suspension to be filtered into said distribution means and for passing filtrate from said filtration member outer layers through said filtrate distribution means out said outflow bore.

13. The device of claim 12 in which said means for passing includes means for applying a pressure differential to cause a flow of fluid suspension through said inflow bore, through said fluid suspension distributing means to said zones, thence flow of fluid through said filtration member from said outer layer to said inner layer, thence through said filtrate distribution means out said outflow bore.

14. The filtration device of claim 12 in which said outlets open in a direction from normal to substantially parallel to the axis of said shaft.

15. The filtration device of claim 12 in which at least one of said outlets is bifurcated and each bifurcated outlet opens in a direction in the range from acutely angled towards the shaft to substantially parallel to the axis of said shaft.

16. A filtration device for filtering fluid medium from matter in fluid suspension, comprising:

a. a rotary shaft having a longitudinal axis and containing means defining:
   (1) an inflow bore having an axis substantially parallel to the longitudinal axis of said shaft, and
   (2) an outflow bore spaced apart from and substantially parallel to said inflow bore, b. at least one annular porous filtration member coaxially fixedly engaging said shaft and comprising a porous inner support layer and a porous outer filtration layer enveloping the inner support layer, the pores in the outer layer being smaller than the pores in the inner layer, the pores of said layers being in fluidic communication so that upon immersion in a said fluid suspension the fluid medium can pass from the outer layer to the inner layer, c. fluid suspension distribution means radially outwardly and circumferentially in fluid communication with such inflow bore for distributing fluid suspension from said inflow bore exteriorly of said shaft into a processing zone adjacent said annular porous filtration member, d. filtrate distribution means circumferentially and radially inwardly in fluid communication with said outflow bore and inwardly concentric to said filtration member for distributing filtrate from said filtration member into said outflow bore, e. sealing means juxtaposed above and below said filtration member coaxially fixedly sealingly engaging said shaft and engaging said filtration member for sealing off fluid communication between said fluid suspension distribution means and said filtrate distribution means, f. an inlet conduit providing a fluid path between a remote source of a said fluid suspension to be processed and said inflow bore, g. an outlet conduit providing a fluid path from said outflow bore to a place remote from said shaft, h. means for applying a pressure differential to said inlet and outlet conduits to cause a flow of fluid suspension through such inlet conduit, through said inflow bore, through said fluid suspension distributing means to said processing zone, thence flow of fluid through said filtration member from said outer layer to said inner layer, thence through said filtrate distribution means through said outflow bore to said outlet conduit, and i. means for imparting rotary motion to said rotary shaft 17. A filtration device for filtering fluid medium from matter in a fluid suspension in a vessel, which comprises:

a. a rotary shaft having a longitudinal axis and journaled to rotate in the vessel, and including means defining:
   (1) an outflow bore having an axis substantially parallel to the longitudinal axis of said shaft,
   (2) a plurality of circumferential external grooves in the periphery of said shaft, coaxial to the longitudinal axis of said shaft and spaced apart at predetermined intervals along the length of said shaft,
   (3) at least one groove passageway for each said groove, substantially normal to the axis of said outflow bore and interconnecting each said groove with said outflow bore,
   (4) an inflow bore spaced apart from and substantially parallel to said outflow bore, and
   (5) a plurality of portways from said inflow bore to the exterior of said shaft substantially normal to the axis of said inflow bore, with at least one said portway above, and at least one said portway below, each of adjacent ones of said plurality of circumferential grooves, b. a plurality of annular porous filtration discs having inner and outer perimeters and comprising a porous inner support layer and a porous outer filtration layer confiningly overlaying the inner support layer, the pores in the outer layer being smaller than the pores in the inner layer, the pores of said layers being in fluidic communication so that upon immersion in a fluid suspension the fluid medium can pass from one layer to another, each said annular filtration disc being coaxially secured to said shaft with the inner support layer fluidically communicatively aligned at the inner perimeter thereof with one of said external grooves, such that upon immersion a continuous fluid path exists from said outer layer to said inner layer to said external groove to said groove passageway to said outflow bore, c. a plurality of annular sealing and distributing means having inner and outer perimeters and coaxially secured said shaft, each annular sealing and distributing means including means defining both a circumferential distributing groove in the inner perimeter thereof coaxial to said shaft and at least one fluidway, substantially normal to said shaft axis communicating said inner groove exteriorly to the outer perimeter thereof, each said annular sealing and distributing means (i) being juxtaposed to each next adjacent filtration disc, (ii) having said inner groove in alignment with one of said portways, and (iii) sealingly engaging each said next adjacent filtration member for sealing off fluid communication between said external groove and said inner groove, whereby, upon admission of a fluid suspension into said inlet bore to be processed, a continuous fluid path exists from said inflow bore through each said portway through a said inner groove through a said fluidway to the exterior of said annular sealing and distributing means adjacent an outer layer of a said filtration member, d. said shaft being adapted for connection of said inflow bore to an inlet conduit for admission of a fluid suspension to be processed, and for connection of said outlet bore to an outlet conduit for discharge of filtrate of said fluid suspension, and e. means for imparting rotary motion to said rotary shaft.

* * * * *